United States Patent
Hammock et al.

(10) Patent No.: US 9,830,612 B2
(45) Date of Patent: Nov. 28, 2017

(54) SYSTEMS AND METHODS FOR PROVIDING ADVERTISING SERVICES

(71) Applicants: Luke A. Hammock, District of Columbia, DC (US); Janusz Michael Niczyporuk, Vienna, VA (US)

(72) Inventors: Luke A. Hammock, District of Columbia, DC (US); Janusz Michael Niczyporuk, Vienna, VA (US)

(73) Assignee: Capital One Financial Corporation, McLean, VA (US)

(*) Notice: Subject to any disclaimer, the term of this patent is extended or adjusted under 35 U.S.C. 154(b) by 0 days.

(21) Appl. No.: 14/142,989

(22) Filed: Dec. 30, 2013

(65) Prior Publication Data

US 2014/0257979 A1    Sep. 11, 2014

Related U.S. Application Data

(60) Provisional application No. 61/775,755, filed on Mar. 11, 2013.

(51) Int. Cl.
*G06Q 30/00* (2012.01)
*G06Q 30/02* (2012.01)

(52) U.S. Cl.
CPC .............................. *G06Q 30/0242* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,788,577 B2* | 8/2010 | Lueck | ............... | G06F 17/30905 707/749 |
| 8,161,412 B2* | 4/2012 | Weeks | ................... | H04H 20/93 348/461 |
| 8,768,838 B1* | 7/2014 | Hoffman | ................ | G06Q 40/00 705/44 |
| 9,167,312 B2* | 10/2015 | Archer | ............... | H04N 21/4147 |
| 2001/0049627 A1* | 12/2001 | Simpson | ................ | G06Q 30/02 705/14.12 |
| 2003/0061172 A1* | 3/2003 | Robinson | ............... | G06Q 20/04 705/67 |
| 2003/0158776 A1* | 8/2003 | Landesmann | .......... | G06Q 30/02 705/14.25 |
| 2004/0204983 A1* | 10/2004 | Shen | ...................... | G06Q 10/10 705/14.43 |
| 2004/0204989 A1* | 10/2004 | Dicker | ................... | G06Q 30/02 705/14.13 |

(Continued)

*Primary Examiner* — Matthew T Sittner
(74) *Attorney, Agent, or Firm* — Finnegan, Henderson, Farabow, Garrett & Dunner LLP

(57) ABSTRACT

The disclosed embodiments include methods, systems, and articles of manufacture for providing advertising services. In one embodiment, a system is provided for receiving a user registration request, identifying advertisements in content presented at client devices of the user during a first time period, providing alternative advertisements to the client devices in substantially real-time to replace the identified advertisements, receiving user financial data indicating purchases of the user during the first time period, associating user purchases with the alternative advertisements provided during the first time period based on the user's financial data, and determining an efficacy score one or more of the alternative advertisements based on the association.

18 Claims, 9 Drawing Sheets

(56) References Cited

U.S. PATENT DOCUMENTS

| | | | |
|---|---|---|---|
| 2006/0080167 A1* | 4/2006 | Chen | G06Q 30/02 705/14.68 |
| 2006/0248020 A1* | 11/2006 | Robinson | G06Q 20/04 705/69 |
| 2006/0282319 A1* | 12/2006 | Maggio | G06Q 30/02 705/14.19 |
| 2007/0130003 A1* | 6/2007 | Davis | G06Q 30/02 705/14.49 |
| 2007/0179857 A1* | 8/2007 | Collins | G06Q 30/0254 705/14.52 |
| 2007/0219949 A1* | 9/2007 | Mekikian | G06Q 30/0258 |
| 2007/0233571 A1* | 10/2007 | Eldering | G06Q 30/02 705/14.53 |
| 2008/0071640 A1* | 3/2008 | Nguyen | G06Q 20/387 705/14.27 |
| 2008/0097813 A1* | 4/2008 | Collins | G06Q 30/0249 705/14.48 |
| 2008/0127246 A1* | 5/2008 | Sylvain | H04N 21/25435 725/32 |
| 2008/0172285 A1* | 7/2008 | Hurowitz | G06Q 30/02 455/414.1 |
| 2008/0235087 A1* | 9/2008 | Amento | G06Q 30/02 705/14.54 |
| 2008/0270538 A1* | 10/2008 | Garg | G06Q 10/10 709/204 |
| 2008/0290987 A1* | 11/2008 | Li | G06Q 30/02 340/5.1 |
| 2008/0294510 A1* | 11/2008 | Gussoni | G06Q 30/02 705/14.26 |
| 2008/0300984 A1* | 12/2008 | Li | G06Q 30/02 705/14.35 |
| 2009/0037949 A1* | 2/2009 | Birch | G06Q 30/02 725/34 |
| 2009/0157511 A1* | 6/2009 | Spinnell | G06Q 30/02 705/14.1 |
| 2009/0171723 A1* | 7/2009 | Jenkins | G06Q 10/10 705/38 |
| 2009/0193460 A1* | 7/2009 | Barnett | G06Q 30/02 725/38 |
| 2009/0210900 A1* | 8/2009 | Kaftan | H04N 21/234318 725/34 |
| 2009/0281897 A1* | 11/2009 | Antos | G06F 17/30746 705/14.45 |
| 2009/0307072 A1* | 12/2009 | Morales-Lema | G06Q 30/02 705/14.17 |
| 2010/0114668 A1* | 5/2010 | Klein | G06Q 30/02 705/14.42 |
| 2010/0114720 A1* | 5/2010 | Jones | G06Q 30/0251 705/14.73 |
| 2010/0207874 A1* | 8/2010 | Yuxin | G06F 3/017 345/156 |
| 2010/0211450 A1* | 8/2010 | Landesmann | G06Q 20/20 705/14.25 |
| 2011/0178856 A1* | 7/2011 | Micaelian | G06Q 30/02 705/14.17 |
| 2011/0178880 A1* | 7/2011 | Karaoguz | G06Q 30/02 705/14.73 |
| 2011/0191166 A1* | 8/2011 | Joa | G06Q 30/02 705/14.45 |
| 2011/0296004 A1* | 12/2011 | Swahar | G06F 17/3053 709/224 |
| 2011/0314495 A1* | 12/2011 | Zenor | G06Q 30/02 725/34 |
| 2012/0053965 A1* | 3/2012 | Hellman | G06Q 40/00 705/4 |
| 2012/0116882 A1* | 5/2012 | Sanghavi | G06Q 30/0257 705/14.55 |
| 2012/0116883 A1* | 5/2012 | Asam | G06Q 30/0251 705/14.58 |
| 2012/0158455 A1* | 6/2012 | Pathak | G06Q 30/0201 705/7.29 |
| 2012/0158502 A1* | 6/2012 | Chung | G06Q 30/0269 705/14.53 |
| 2012/0173387 A1* | 7/2012 | Talker | G06Q 30/0641 705/27.1 |
| 2012/0191534 A1* | 7/2012 | Tavares | G06Q 30/0246 705/14.45 |
| 2012/0221392 A1* | 8/2012 | Baker | G06Q 30/0207 705/14.17 |
| 2013/0018719 A1* | 1/2013 | Abraham | G06Q 30/0242 705/14.41 |
| 2013/0024274 A1* | 1/2013 | Villars | G06Q 10/00 705/14.45 |
| 2013/0138968 A1* | 5/2013 | Yudkin | G06F 21/602 713/183 |
| 2013/0151332 A1* | 6/2013 | Yan | G06Q 30/0243 705/14.42 |
| 2013/0160046 A1* | 6/2013 | Panje | H04N 21/4126 725/32 |
| 2013/0191213 A1* | 7/2013 | Beck | G06Q 30/0267 705/14.53 |
| 2013/0238413 A1* | 9/2013 | Carlson | G06Q 30/0224 705/14.25 |
| 2013/0246165 A1* | 9/2013 | Choi | G06Q 30/00 705/14.45 |
| 2013/0275215 A1* | 10/2013 | LeBlanc | G06Q 30/02 705/14.53 |
| 2013/0275222 A1* | 10/2013 | Amaro | G06Q 20/102 705/14.58 |
| 2013/0276010 A1* | 10/2013 | Drayson | H04N 21/44222 725/14 |
| 2013/0290094 A1* | 10/2013 | Srivastava | G06Q 30/0245 705/14.44 |
| 2013/0311308 A1* | 11/2013 | Huang | G06Q 30/0251 705/14.73 |
| 2013/0332281 A1* | 12/2013 | Alvin | G06Q 10/087 705/14.58 |
| 2013/0339127 A1* | 12/2013 | Plut | G06Q 30/02 705/14.42 |
| 2014/0012677 A1* | 1/2014 | Wagner | G06Q 30/02 705/14.64 |
| 2014/0025483 A1* | 1/2014 | Villars | G06Q 30/0242 705/14.45 |
| 2014/0032311 A1* | 1/2014 | Cramer | G06F 17/30702 705/14.45 |
| 2014/0032326 A1* | 1/2014 | Li | G06Q 30/0261 705/14.58 |
| 2014/0040016 A1* | 2/2014 | Amla | G09F 21/04 705/14.45 |
| 2014/0040018 A1* | 2/2014 | Dellovo | G06Q 10/0637 705/14.45 |
| 2014/0074605 A1* | 3/2014 | Sanchez | G06Q 20/40 705/14.53 |
| 2014/0164145 A1* | 6/2014 | Hammock | G06Q 30/0275 705/14.71 |
| 2014/0180819 A1* | 6/2014 | Grimes | G06Q 30/02 705/14.58 |
| 2014/0257979 A1* | 9/2014 | Luke | G06Q 30/0242 705/14.53 |
| 2016/0044344 A1* | 2/2016 | Plotnick | G11B 27/005 725/34 |

* cited by examiner

SYSTEMS AND METHODS FOR PROVIDING ADVERTISING SERVICES

CROSS-REFERENCE TO RELATED APPLICATIONS

This application claims priority under 35 U.S.C. §119 to U.S. Provisional Application No. 61/775,755, filed on Mar. 11, 2013, which is expressly incorporated herein by reference in its entirety.

BACKGROUND

Consumers today are continuously subjected to advertising messages on virtually every available communication medium. For example, consumers are regularly presented with commercials when watching television or listening to the radio. Similarly, consumers are constantly exposed to "pop-ups" and "banner ads" when viewing websites or electronic documents. Despite the prevalence of advertisements today, the effectiveness of these advertisements remains elusive due to difficulty in attributing a consumer's purchase with any particular advertisement, advertising campaign, or means of presenting advertisements. Thus, entities wishing to advertise are left with uncertainty regarding the most effective means of reaching their target audience. Advertising entities are therefore also left with uncertainty as to the return on investment for advertising their brand, product, or service.

Consumers also become dissatisfied with receiving advertisements for which they have no interest. For example, a person who has recently purchased a new primary residence may not wish to receive advertising for home financing options, real estate listings, etc. That same person, however, may have a strong interest in receiving advertisements associated with home improvement products and services. In contrast, media content providers typically "air" advertisements based only on contractual obligations to the companies that have paid to have their advertisements aired a certain number of times, during a certain time period, etc. with little or no ability to know or accommodate preferences of the consumers. Thus, consumers currently have little or no control over the advertising presented to them.

SUMMARY

Disclosed embodiments include methods, systems, and articles of manufacture configured to, for example, monitor advertisements presented on one or more client devices associated with a user (or group of users), determine the effectiveness of such advertising based on the user's (or group of users') financial transactions, and/or provide alternative consumer advertising at the client devices. For example, a user may register for an advertising service that observes and/or replaces advertisements presented on the user's client devices. Consistent with disclosed embodiments, user financial transactions may be compared to or otherwise associated with the observed and/or replacement advertisements to determine the effectiveness of those advertisements on user spending.

In some embodiments, a financial service provider, such as a credit card company, bank, lender, etc., may provide the advertising service via an advertising system configured to monitor advertisements presented on the client devices. Systems associated with the financial service provider may store data regarding the detected advertisements for comparison against financial records associated with the user. Consistent with disclosed embodiments, systems associated with the financial service provider may be further configured to replace detected advertisements with alternative advertisements chosen by the financial service provider in substantially real-time. In some embodiments, the systems associated with the financial service provider may also (or alternatively) replace the detected advertisements according to customer preferences. Other aspects of the disclosed embodiments will be evident to those of skill in the art from this disclosure.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
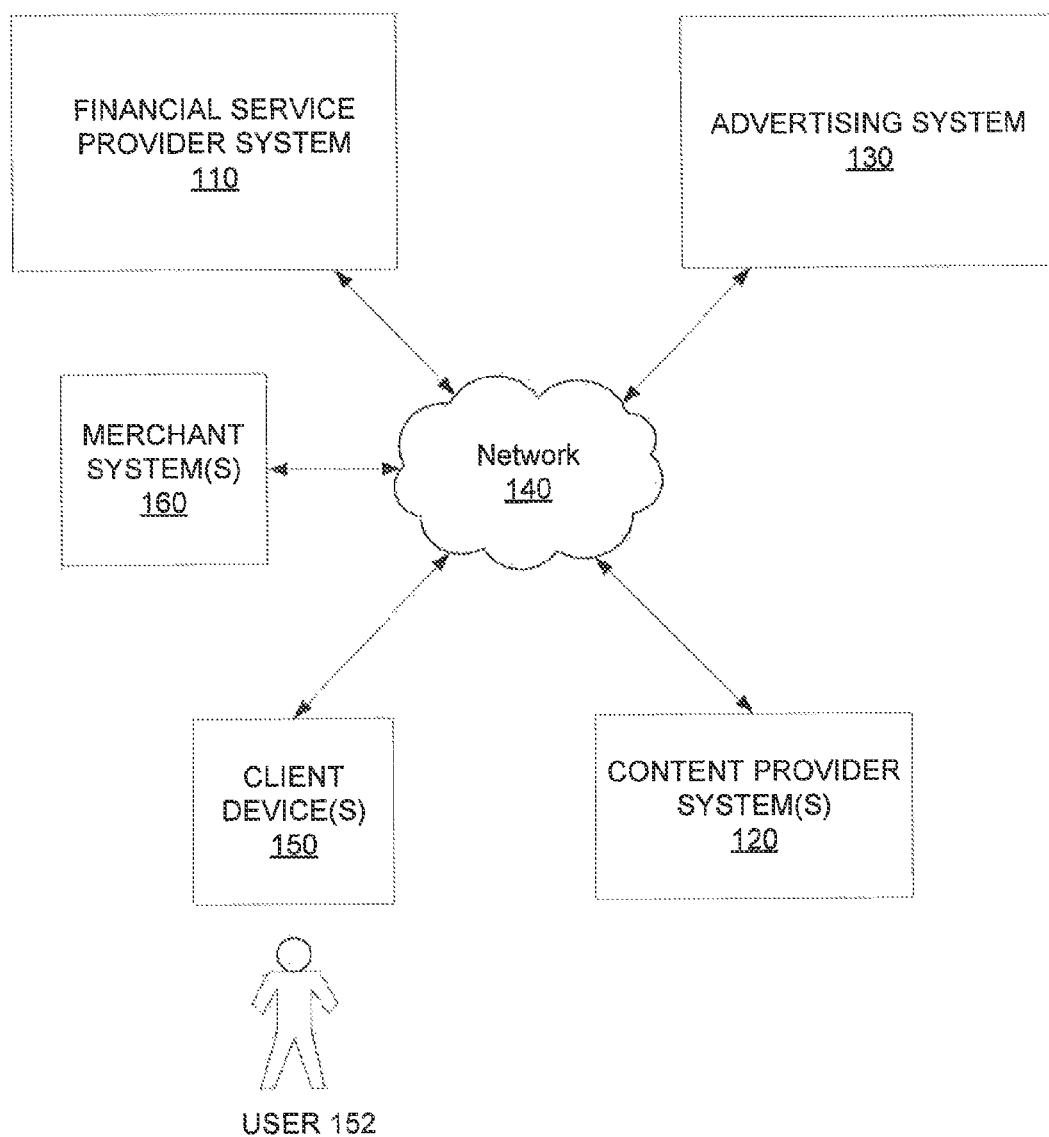
FIG. 1 is a block diagram of an exemplary system, consistent with disclosed embodiments.

FIG. 1 is a block diagram of an exemplary system 100 for performing one or more operations consistent with the disclosed embodiments. In one embodiment, system 100 may include one or more financial service provider systems 110, one or more content provider systems 120, on or more advertising systems 130, one or more clients devices 150, one or more merchant systems 160, and network 140. The components and arrangement of the components included in system 100 may vary. Thus, system 100 may include other components that perform or assist in the performance of one or more processes consistent with the disclosed embodiments.

Components of system 100 may be computing systems configured to provide an advertising service consistent with disclosed embodiments. As further described herein, components of system 100 may include one or more computing devices (e.g., computer(s), server(s), etc.), memory storing data and/or software instructions (e.g., database(s), memory devices, etc.), and other known computing components. In some embodiments, the one or more computing devices are configured to execute software instructions stored on one or more memory devices to perform one or more operations consistent with the disclosed embodiments. Components of system 100 may be configured to communicate with one or more other components of system 100, including financial service provider system 110, content provider systems 120, advertising system 130, client devices 150, and/or merchant systems 160. In certain aspects, users may operate one or more components of system 100 to initiate one or more operations consistent with the disclosed embodiments. In some aspects, the one or more users may be employees of, or associated with, the entity corresponding to the respective component(s) (e.g., someone authorized to use the underlying computing systems or otherwise act on behalf of the entity). In other aspects, the user may not be an employee or otherwise associated with underlying entity. In still other aspects, the user may itself be the entity associated with the respective component (e.g., user 152 operating client device 150).

Financial service provider system(s) 110 may be a system associated with an entity providing financial services. For example, financial service provider system 110 may be associated with a bank, credit card issuer, or other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. Financial service provider system 110 may include infrastructure and components that are configured to generate and/or provide financial service accounts such as credit card accounts, checking accounts, debit card accounts, loyalty or reward programs, lines of credit, and the like.

Content provider system(s) 120 may be may be a system associated with an entity that provides content viewed, listened to, or otherwise consumed by users. For example, content provider systems 120 may be associated with a broadcasting network, radio network, website, news service, social network, digital media source, or other type of entity that generates, provides, manages, distributes, and/or delivers content to others. For instance, as non-limiting examples, content provider system 120 may be associated with a television network (e.g., ABC®, NBC®, CBS®, FOX Broadcasting Company Turner Broadcasting System®, etc.), cable company (Comcast®, Time Warner Cable®, etc.), radio service (NPR®, Sirius Radio®, Xfinity®), news service (Yahoo®, New York Times®, Wall Street Journal®, etc.), or digital media source (Amazon®, Hulu®, Netflix®, YouTube®, etc.). Content provider systems 120 may further include infrastructure and components configured to generate, provide, manage, distribute, and/or deliver content. Content provider system(s) 120 may deliver dynamic media content (i.e., video, audio, interactive content, etc.) and/or static content (digital print media, images, etc.).

Advertising system(s) 130 may be a computing system configured to provide advertising services consistent with disclosed embodiments, as further described herein. In one embodiment, advertising system 130 may be related to an entity that provides advertising services or measures the effectiveness of advertising. For example, advertising system 130 may be a computing system provided by an advertising or marketing agency. According to some embodiments, advertising system 130 may be a computing system provided by a financial service provider. Advertising system 130 may include one or more computing devices (e.g., server(s)), memory storing data and/or software instructions (e.g., database(s), memory devices, etc.) and other known computing components. Advertising system 130 may be configured to communicate with one or more components of system 100, such as financial service provider system 110, merchant systems 160, and/or client devices 150. Advertising system 130 may be configured to provide an advertising service that provides interface(s) accessible by users over a network (e.g., the Internet).

Client device(s) 150 may be one or more computing devices configured to perform one or more operations consistent with disclosed embodiments. Client device 150 may be a desktop computer, a laptop, a server, a mobile device (e.g., tablet, smart phone, etc.), or any other type of computing device. Client device 150 may also include a television, radio, e-reader, or any other type of device capable of presenting media and/or advertising content. According to some embodiments, client device 150 may comprise a network-enabled computing device operably connected to one or more other presentation devices, which may themselves constitute client devices 150.

Client device(s) 150 may include one or more processors configured to execute software instructions stored in memory, such as memory included in client device 150. Client device 150 may include software that when executed by a processor performs known Internet-related communication and content presentation processes. For instance, client device 150 may execute software that generates and displays interfaces and/or content on a presentation device included in, or connected to, client device 150. Client device 150 may be a mobile device that executes mobile device applications and/or mobile device communication software that allows client device 150 to communicate with components over network 140. Client device 150 may intercept, monitor, or otherwise observe content presented by a separate presentation device. For example, client device 150 may be a device that processes a video/signal associated with a television. In another example, client device 150 may visually observe a television screen or other electronic publications. In still another example, client device 150 may be a listening device that observes acoustics emitted from a vehicle stereo system. The disclosed embodiments are not limited to any particular configuration of client device 150.

Merchant system(s) 160 may be computing systems associated with merchant entities that provide goods, services, and/or information such as a retailer (e.g., Macy's®, Target®, etc.), grocery store, service provider (e.g., utility company, etc.), non-profit organization (ACLU™, AARP®, etc.) or any other type of entity that provides goods, services, and/or information that consumers (i.e., end-users or other business entities) may purchase, consume, use, etc. Merchant system(s) 160 is not limited to systems associated with merchant(s) that conduct business in any particular industry or field.

Merchant system 160 may be associated with a merchant brick and mortar location(s) that a consumer (e.g., user 152) may physically visit and purchase goods and services. Such physical locations may include merchant system 160, which may include computing devices that perform financial service transactions with consumers (e.g., Point of Sale (POS) terminal(s), kiosks, etc.). Merchant system 160 may also include back- and/or front-end computing components that store data and execute software instructions to perform operations consistent with disclosed embodiments, such as computers that are operated by employees of the merchant (e.g., back office systems, etc.). Merchant system 160 may also be associated with a merchant that provides goods and/or service via known online or e-commerce type of solutions. For example, such a merchant may sell goods via a website using known online or e-commerce systems and solutions to market, sell, and process online transactions. Merchant system 160 may include server(s) that are configured to execute stored software instructions to perform operations associated with a merchant, including one or more processes associated with processing purchase transactions, generating transaction data, generating product data (e.g., SKU data) relating to purchase transactions, etc.

Network 140 may be any type of network configured to provide communications between components of system 100. For example, network 140 may be any type of network (including infrastructure) that provides communications, exchanges information, and/or facilitates the exchange of information, such as the Internet, a Local Area Network, or other suitable connection(s) that enables the sending and receiving of information between the components of system 100. In other embodiments, one or more components of system 100 may communicate directly through a dedicated communication link(s), such as links between financial service provider system 110, content provider systems 120, advertising system 30, client devices 150, and merchant systems 160.

Figure 2:
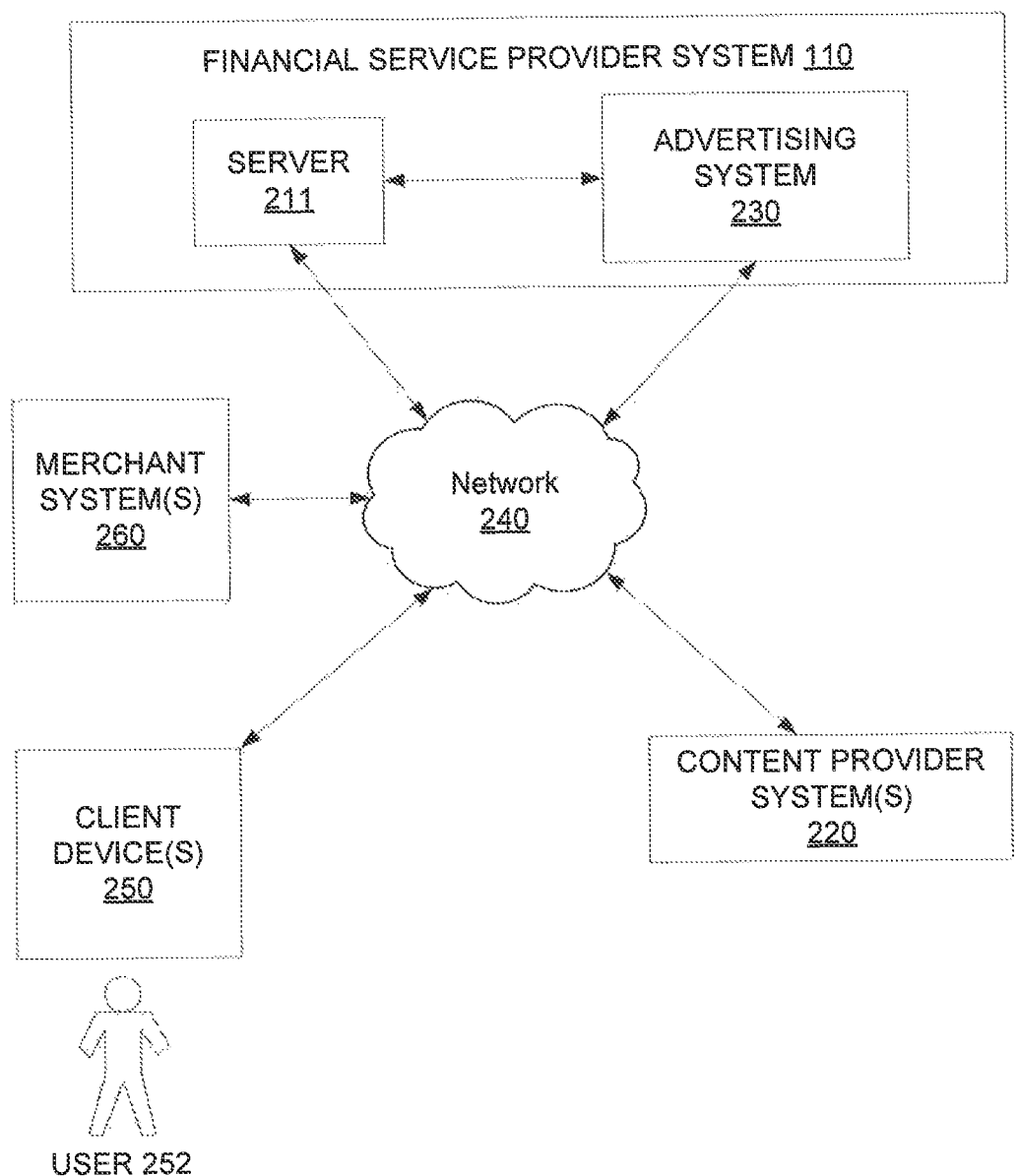
FIG. 2 is a block diagram of another exemplary system, consistent with disclosed embodiments.

FIG. 2 is a block diagram of another exemplary system 200 for performing one or more operations consistent with the disclosed embodiments. In certain embodiments, financial service provider system 210 may be configured to provide advertising services consistent with disclosed embodiments. For example, financial service provider system 210 may include an advertising system 230 that is configured to provide advertising services in a manner consistent with that disclosed above in connection with advertising system 130 shown in FIG. 1. Consistent with disclosed embodiments, advertising system 230 may use or otherwise directly communicate with computing devices of financial service provider 210 (e.g., server 211). Furthermore, advertising system 130 may directly access memory devices of financial service provider 210 (not shown) to retrieve, for example, financial transaction data associated with a user of advertising system 230. Financial service provider 110 may otherwise be configured and operate similar to financial service provider system 210 disclosed above in connection with FIG. 1. Similarly, content provider systems 220, advertising systems 230, client devices 250, and merchant systems 260 may be configured and operate similar to similarly labeled components disclosed above in connection with FIG. 1.

It is to be understood that the configuration and boundaries of the functional building blocks of systems 100 and 200 have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, advertising systems 130, 230 may constitute a part of components of systems 100, 200 other than those specifically described (e.g., merchant system 160, 260; client devices 150, 250; and/or content provider systems 120, 220) or may constitute a part of multiple components of system 100 (i.e., a distributed system). Such alternatives fall within the scope and spirit of the disclosed embodiments.

Figure 3:
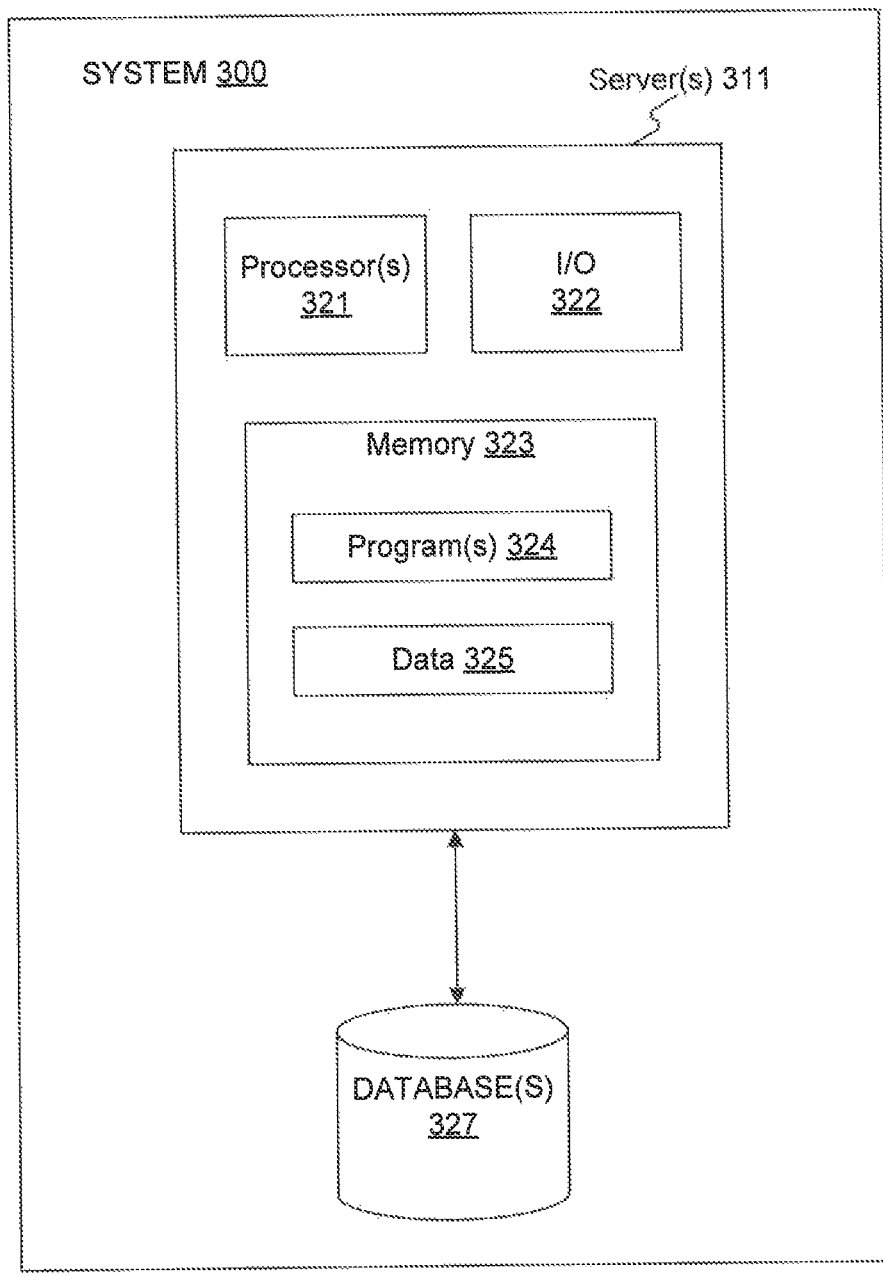
FIG. 3 is a block diagram of another exemplary system, consistent with disclosed embodiments.

FIG. 3 shows an exemplary system 300 for implementing embodiments consistent with the present disclosure. Variations of exemplary system 300 may be used by financial service provider system 110, content provider system 120, advertising system 130, client devices 150, and/or merchant systems 160. In one embodiment, system 300 may include a server 311 having one or more processors 321, one or more memories 323, and one or more input/output (I/O) devices 322. In some embodiments, server 311 may take the form of a mobile computing device, general purpose computer, a mainframe computer, or any combination of these components. Alternatively, server 311 (or a system including server 311) may be configured as a particular apparatus, embedded system, dedicated circuit, and the like based on the storage, execution, and/or implementation of the software instructions that perform one or more operations consistent with the disclosed embodiments. According to some embodiments, server 311 may comprise web server(s) or similar computing devices that generate, maintain, and provide web site(s) consistent with disclosed embodiments. Server 311 may be standalone, or it may be part of a subsystem, which may be part of a larger system. For example, server 311 may represent distributed servers that are remotely located and communicate over a network (e.g., network 140) or a dedicated network, such as a LAN. Server 311 may correspond to server 211, or separately to any server or computing device included in financial service provider system 110, content provider system 120, advertising system 130, client devices 150, and/or merchant systems 160.

Processor 321 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 311.

Memory 323 may include one or more storage devices configured to store instructions used by processor 321 to perform functions related to disclosed embodiments. For example, memory 323 may be configured with one or more software instructions, such as program(s) 324 that may perform one or more operations when executed by processor 321. The disclosed embodiments are not limited to separate programs or computers configured to perform dedicated tasks. For example, memory 323 may include a single program 324 that performs the functions of the server 311, or program 324 could comprise multiple programs. Additionally, processor 321 may execute one or more programs located remotely from server 311. For example, financial service provider system 110, content provider system 120, advertising system 130, client devices 150, and/or merchant systems 160, may, via server 311, access one or more remote programs that, when executed, perform functions related to certain disclosed embodiments. Memory 323 may also store data 325 that may reflect any type of information in any format that the system may use to perform operations consistent with the disclosed embodiments.

I/O devices 322 may be one or more devices configured to allow data to be received and/or transmitted by server 311. I/O devices 322 may include one or more digital and/or analog communication devices that allow server 311 to communicate with other machines and devices, such as other components of systems 100 and 200.

Server 311 may also be communicatively connected to one or more database(s) 327. Server 311 may be communicatively connected to database(s) 327 through network 140. Database 327 may include one or more memory devices that store information and are accessed and/or managed through server 311. By way of example, database(s) 327 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, system 300 may include database 327. Alternatively, database 327 may be located remotely from the system 300. Database 327 may include computing components (e.g., database management system, database server, etc.) configured to receive and process requests for data stored in memory devices of database(s) 327 and to provide data from database 327.

Figure 4:
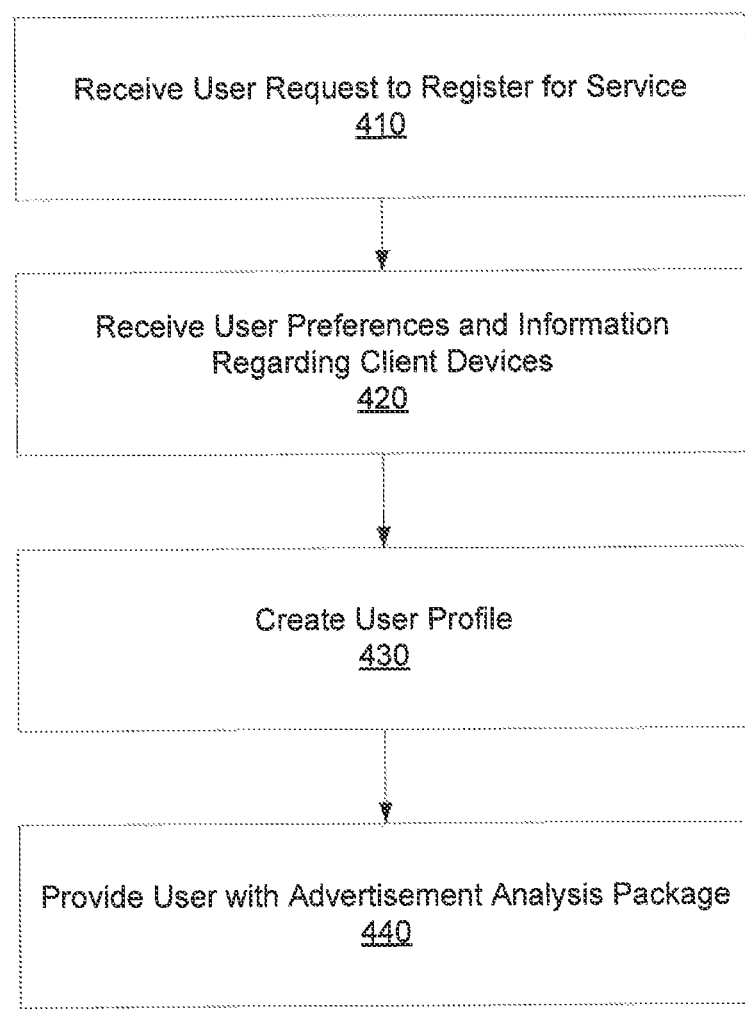
FIG. 4 is a flowchart of an exemplary user registration process, consistent with disclosed embodiments.

FIG. 4 shows a flowchart of an exemplary advertising service registration process 400, consistent with disclosed embodiments. In one aspect, advertising system (e.g., system 130, 230), may receive a request from a user (e.g., user 152, 252) to register with the advertising service (step 410). The request may be provided via an advertising service portal using interfaces provided to a client device (e.g., client device 150, 250) or any other computing device relating to the user, The advertising system may request and receive information from the user (step 420), such as demographic information and self-provided characteristics (e.g., interests, hobbies, favorite products, movies, etc.). The advertising system may create user log-in credentials based on user input for subsequent use in accessing the advertising system. The advertising system may also request and receive information regarding client devices associated with the user (e.g., client devices 150, 250). For example, the advertising system may receive information regarding the quantity, type, make, model, etc. of client devices 150, 250. In some embodiments, the advertising system may receive information regarding one or more client devices 150, 250 associated with the user when the user employs the one or more client devices 150 to communicate with the advertising system.

In addition, the advertising system may request and receive financial service account information from the user. For example, the advertising system may receive information from the user that allows the advertising system to interface with and receive information from one or more financial service providers for which the user is a customer (e.g., a financial service provider associated with financial service provider system 110). The financial service account information may include the identity of the financial service account provider, the identity of a financial service account, and/or credentials that enable the advertising system to access, receive, and/or store information relating to the user's financial account. Additionally or alternatively, the advertising system may receive information from the user allowing the advertising system to access one or more financial management systems (e.g., Quicken, Mint.com, etc.), which themselves may store information (including log-in credentials for one or more financial service accounts) associated with one or more of the user's financial accounts. In some embodiments, the advertising system may obtain (e.g., via client devices 150, 250) credentials for accessing user financial account(s) via screen scraping during a user log-in procedure, keystroke logging during a user log-in procedure, accessing password files store on one or more client device(s), etc. The advertising system may use the received financial service account information to access the financial management systems and identify, access, and/or store data associated with financial transaction data, spending habits, etc. of the user. In some embodiments, the advertising system ay use the financial service account information to communicate with a financial service provider system (e.g., financial service provider system 110, 210) to configure a communication protocol and/or link that enables the advertising system to receive information from the financial service provider system (e.g., 110, 210) relating to purchase transactions made by the user using a financial service account provided by the financial service account provider. In some embodiments, the user may provide the advertising system with authorization to directly access financial service account information. For example, advertising system 230, as part of financial service provider 210, may directly access (i.e., access without user log-in credentials) data stores of the user's financial service providers(s), including data stores associated with user financial service account information.

The advertising system may use the information provided by the user (e.g., at step 420) to create an advertising profile for the user (step 430). According to some embodiments, the advertising system may associate the user with one or more other users of the advertising system based on information reflected in the users' respective advertising profiles. The advertising system may use the user profile information to create, update, edit, or otherwise manage an advertising package for the user. The advertising system may provide the advertising package (step 440) comprising hardware and/or software elements. For example, the advertising package may comprise one or more network-enabled computing devices (e.g., one or more client devices 150, 250) capable of being operably connected to other client devices 150, 250 that are capable of presenting content (television, radio, electronic print media, etc.). Some client devices 150, 250, once operably connected to another client device 150, 250, may intercept, monitor, or otherwise observe content presented by the connected presentation device(s) and communicate those observations to advertising system 130. In some embodiments, client device 150, 250 may be arranged in a man-in-the-middle configuration such that client device 150, 250 receives a signal provided by content provider system 120, 220, observes the content of the signal, and provides the presentation device(s) with a signal (with or without alteration) for presentation on the presentation device(s). In other embodiments, client device 150, 250 observes a copy of the signal presented by the presentation device(s). In still other embodiments, client device 150 perceives a visual depiction and/or sound generated by the presentation device(s). According to some embodiments, client device 150, 250 may itself be a presentation device.

Additionally or alternatively, the advertising package may comprise one or more software programs for installation on one or more user devices 150, 250 capable of presenting media content. The software program(s) may be an .exe file, a mobile app, a shared object (e.g., a Dynamic Link Library (DLL)), etc. For example, the advertising package may include a software program for installation on the user's home computer. In some embodiments, the software program may include one or more plug-ins for web browsers installed on the user's desktop computer. In other embodiments, the software program may include software for a set-top box associated with content provider system(s) 120, 220. Regardless of form, the software program may enable client device(s) 150, 250 to intercept, monitor, or otherwise observe content presented by the underlying presentation device(s) and communicate the observations to advertising system 130, 230. Each client device 150, 250 may be individually identified by advertising system 130, 230.

The advertising package may be customized based on, among other things, user profiles. For example, advertising system 130, 230 may provide software programs(s) compatible with the particular operating system and/or other programs of the user's home computer or mobile computing device. The advertising system may also provide a software "update" or plugin for user devices, including set top boxes, network-connected televisions, etc. The advertising system may also provide hardware devices configured to interface with a particular make and model of one or more of the user's televisions, radios, etc.

Figure 5:
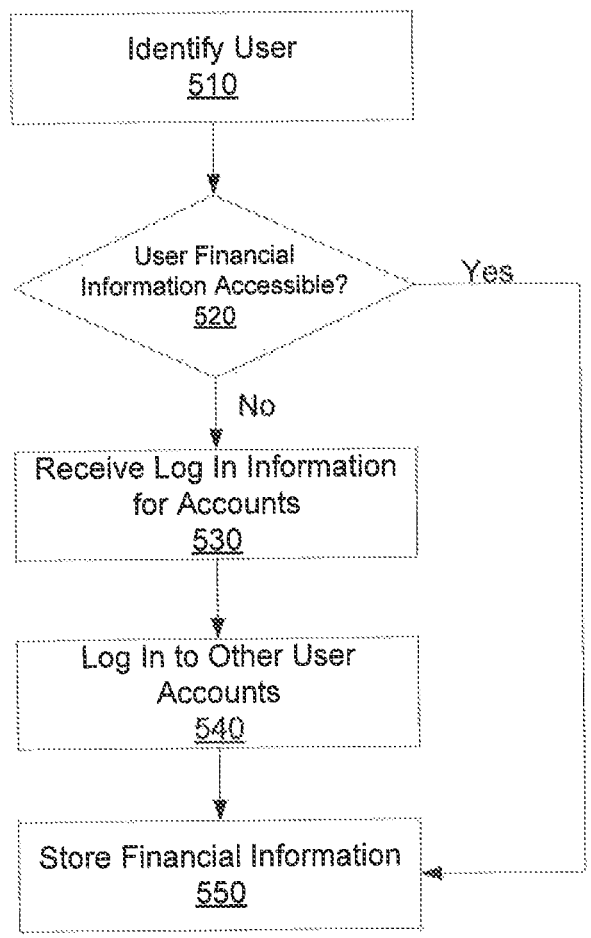
FIG. 5 is a flowchart of an exemplary account information collection process, consistent with disclosed embodiments.

FIG. 5 shows a flowchart of an exemplary account information collection process 500, consistent with disclosed embodiments. At step 510, advertising system 130, 230 may identify a user profile based on, for example, user login information provided by the user (via, e.g., client device 150, 250) to access the user's profile. In some embodiments, advertising system 130, 230 may identify the user profile based on the identification of one or more client devices 150 associated with the user that communicate with advertising system 130, 230. At step 520, the advertising system may determine whether it has access to financial information of the identified user profile. The advertising system may have access to financial information if, for example, the advertising system received user log-in credentials (e.g., during user registration process 400, step 420, or by subsequent user interaction with components of system 100, 200). The advertising system may also have access to financial information of the user if it has an agreement with one or more financial service providers 110, 210 that allows the advertising system to directly access databases and/or other memory devices of the one or more financial service providers 110, 210 storing financial data associated with the user. For example, advertising system 230 forms a subcomponent of a financial service provider 210 and is communicatively connected to databases and/or other memory devices storing financial data associated with the identified user. If the advertising system determines that it has access to financial information of the user (step 520; Yes), the advertising system may store the financial information in databases and/or other memory devices of the advertising system (e.g., step 550). According to some embodiments, the advertising system may request and receive access to additional financial account information of the user. For example, the advertising system may request information associated with financial accounts that the user has not yet identified to the advertising system, or the advertising system may request additional information associated with known financial accounts of the user.

If the advertising system determines that it does not have access to financial information of the user (step 520; No), the advertising system may request and receive login credentials (or authorization to directly access financial service account information) from the user (step 530), e.g., in a manner similar to that discussed above with respect to step 420. The advertising system may use the login credentials and/or authorization to access financial account information associated with the user (e.g., information associated with financial accounts of the user with one or more financial service providers 110, 210). In some embodiments, the financial account information comprises transaction dates, transaction amounts, and other data describing transactions (i.e., retailer and/or manufacture specific information, product identification, SKU data, purchase location information, etc.) associated with user purchases or other transactions. The advertising system may store the accessed financial information in databases and/or other memory devices of the advertising system (step 550). In some embodiments, the transaction data, product data, and/or location data may include information relating to multiple purchase transactions (e.g., one or more user purchase transactions involving a first merchant, and/or one or more purchase transactions involving one or more other merchants). Further, the advertising system may receive transaction data, product data, and/or location data relating to one or more users (e.g., a batch file of transaction data relating to purchase transactions involving many users and merchant systems over a period of time).

Figure 6:
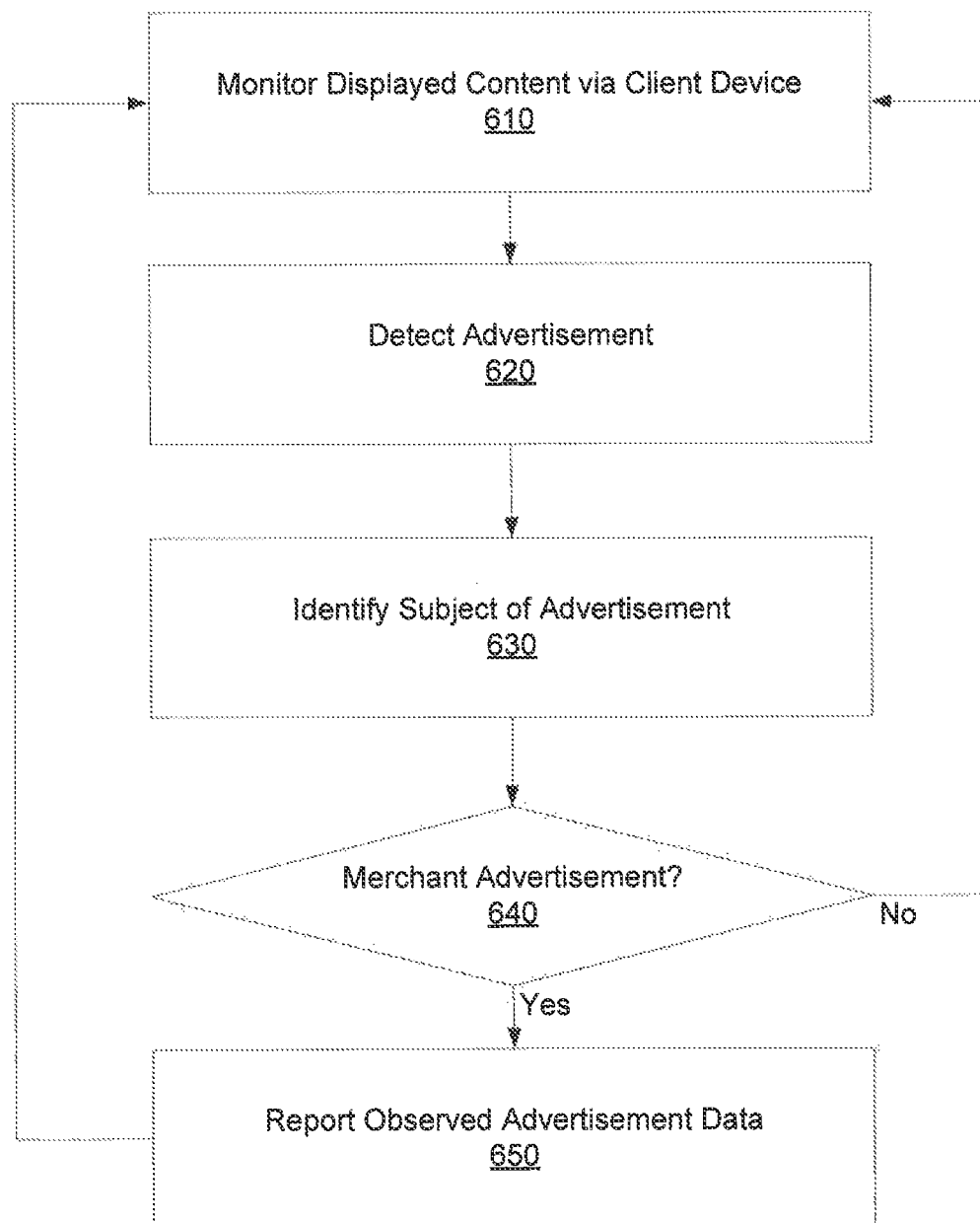
FIG. 6 is a flowchart of an exemplary advertisement detection process, consistent with disclosed embodiments.

FIG. 6 shows a flowchart of an exemplary advertisement detection process 600, consistent with disclosed embodiments. At step 610, client devices 150, 250 may monitor content presented on one or more presentation devices (see, e.g., the discussion above regarding step 440 and advertising packages). While monitoring content, the client devices may detect an advertisement in the content presented (step 620). For example, a client device may determine that a commercial is or will soon become presented at the presentation device based on a "station break" indication embedded in the monitored video and/or audio signal. A client device may also detect an advertisement based on observed visual or audio queues (e.g., NBC's® three-tone chime or the like). Alternatively or additionally, a client device may identify an advertisement based on a determination that the presented content suddenly changed presentation styles, follows a recognized format associated with advertisements, used particular keywords or phrases (spoken or displayed), experienced a sudden change in visual or sound intensity (e.g., the sound became very loud when the commercial appeared), the source of the content presented is being delivered by the server of a known advertiser, visual or sound patterns of the content presented matches visuals or sounds previously determined to be advertisements, etc. Upon detecting an advertisement, the client devices may identify the subject matter of the detected advertisement based on the observed content (step 630). For example, a client device may recognize keywords or phrases (e.g., "jewelry," "buy now," "10% discount," "denim jeans," etc.), trademarks or other images (i.e., car manufacturer logos, McDonald's® golden arches, etc.), distinctive sounds (e.g., a theme song associated with a particular manufacture), etc, to identify the subject matter of the detected advertisement.

In some embodiments, the subject matter may be determined at advertising system 130, 230 based on information provided by one or more client devices. Based on the identified subject matter, the client devices (or advertising system 130, 230) may identify the detected advertisement as an advertisement placed by a merchant or any number of other entity types desiring to alter actions and/or spending habits of the user (step 640). For example, the detected advertisement may be classified as a merchant advertisement based on the identification of a particular merchant, retailer, brand, etc. For example, one or more client devices (or advertising system 130, 230) may identify an advertisement as directed to a particular car manufacturer and/or car model. In another example, the detected advertisement may also be classified as a merchant advertisement based on the identification of keywords or phrases indicating an intent to influence spending (e.g., "sale," "buy now," "discount," etc.). At step 650, one or more client devices may provide data associated with the detected advertisement to advertising system 130. Advertising system 130 may store the provided data and associate it with user 152, 252 based on, for example, the fact that the data was received from a client device(s) associated with the user.

Figure 7:
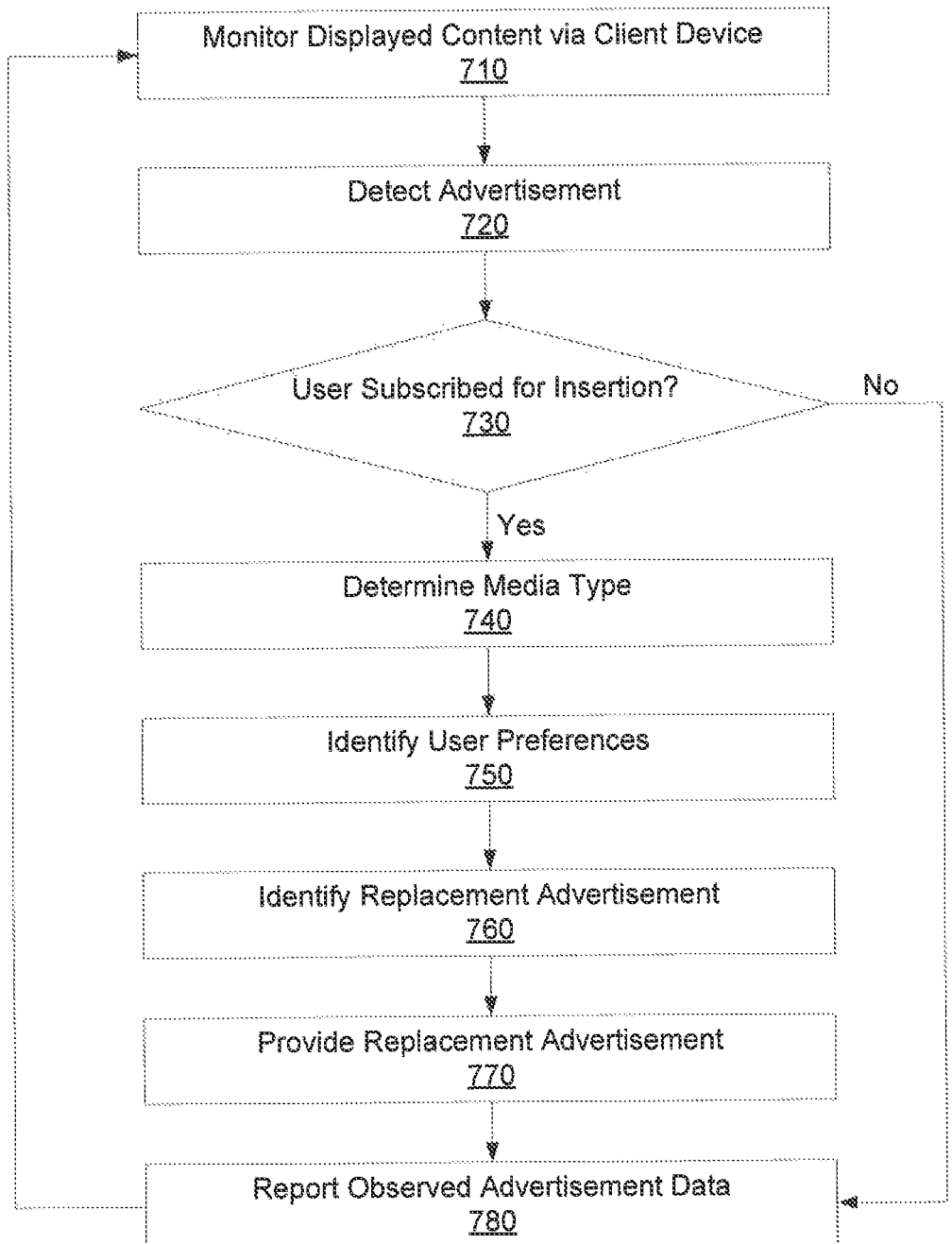
FIG. 7 is a flowchart of an exemplary advertisement insertion process, consistent with disclosed embodiments.

FIG. 7 shows a flowchart of an exemplary advertisement insertion process 700, consistent with disclosed embodiments. At step 710, one or more client devices 150, 250 may monitor content presented on one or more presentation devices (see, e.g., the discussion above regarding step 440 and advertising packages). While monitoring content, the client devices may detect an advertisement in the content presented (step 720). At step 730, the client devices may determine that the user associated with the client devices has subscribed to an advertisement substitution/insertion service. For example, the user may have indicated during user registration process 400 that the advertising system may provide alternative advertisements to those presented in the displayed content provided by, for example, content provider(s) 120, 220. If the client devices determine the user has not subscribed to such services (step 730; No), the client devices may provide data associated with the detected advertisement to the advertising system (e.g., advertising system 130, 230) (step 780). If the client devices determine the user has subscribed to such services (step 730; Yes), the client devices may determine the media type of the advertisement (i.e., video, audio, print media, etc.) (step 740). The media type may be determined based on, for example, the display device (television, radio, e-book reader, website, etc.), metadata associated with the displayed content, etc. At step 750, the client devices may determine user preferences associated with advertisements. For example, user 152 may have indicated during user registration process 400 that the user prefers to receive advertisements associated with one or more particular topics, manufacturers, brands, etc. The client devices may also determine user preferences for received advertising based on indirect feedback (e.g., likes, dislikes, etc. indicated by the user). Indirect feedback may comprise, for example, the user responding to a past advertisement(s) by purchasing the underlying advertised product(s).

At step 760, the advertising system may identify one or more replacement advertisements for the detected advertisements. According to some embodiments, the client devices may make the determination. The replacement advertisements may be determined based on, for example, the determined media type (see step 740), identified user preferences (see step 750), agreements with one or more advertisers, content provider(s) 120, and/or merchant(s) 160, etc. In some embodiments, the advertising system may transmit one or more replacement advertisements for substitution/insertion to the client device(s). Additionally or alternatively, the client devices may have replacement advertisements stored in local memory. At step 770, the client devices may cause the replacement advertisement(s) to become presented on the underlying presentation device(s). For example, the client devices may interrupt the content signal from content provider system(s) 120, 220 and insert a new signal comprising the replacement advertisement(s). For electronic print media, in some embodiments, the client devices may alter the presented content to replace the detected advertising content with the replacement advertisement(s). In other embodiments, the client devices may create an overlay on the print media that remains transparent except at locations on the print media where advertisements are detected, where alternative advertisements are provided instead. The client devices may provide data associated with the presented (i.e., replacement) advertisements to the advertising system. In some embodiments, such as when the advertising system provided the client device(s) with the replacement advertisements, advertising system 130 may store data associated with the presented (i.e., replacement) advertisements in memory devices without the client device (s) providing data. In one aspect, after the replacement advertisement has been provided, one or more client devices may provide data associated with the detected advertisement to advertising system 130, 230 (step 780). In other aspects, the advertising system (e.g., advertising system 130, 230) may perform one or more steps of exemplary advertisement insertion process 700.

Figure 8:
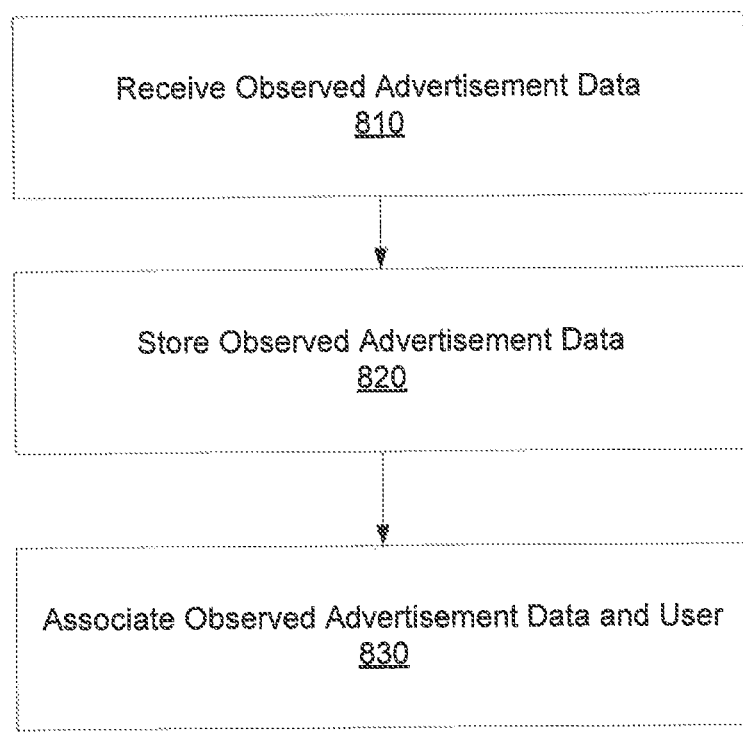
FIG. 8 is a flowchart of an exemplary displayed advertisements collection process, consistent with disclosed embodiments.

FIG. 8 shows a flowchart of an exemplary displayed advertisements collection process 800, consistent with disclosed embodiments. At step 810, advertising system 130, 230 may receive data from client device(s) 150, 250 regarding advertisements observed on one or more presentation devices of user 152, 252. According to some embodiments, the observed advertisements may comprise substituted/inserted advertisements, rather than the advertisements included in the original content (i.e., the content provided by content provider(s) 120 for presentation). At step 820, the advertising system may store data received from the client devices regarding observed advertisements in memory devices associated with the advertising system. As noted above, in some embodiments, such as when the advertising systems provided the client devices with replacement advertisements, the advertising system may store data associated with the presented (i.e., replacement) advertisements in memory devices without the client devices providing data. The advertising system may also associate the data regarding observed advertisements with user 152 (or vice versa) based on, for example, the client device(s) that observed presentation of the advertisement(s) (e.g., step 830).

Figure 9:
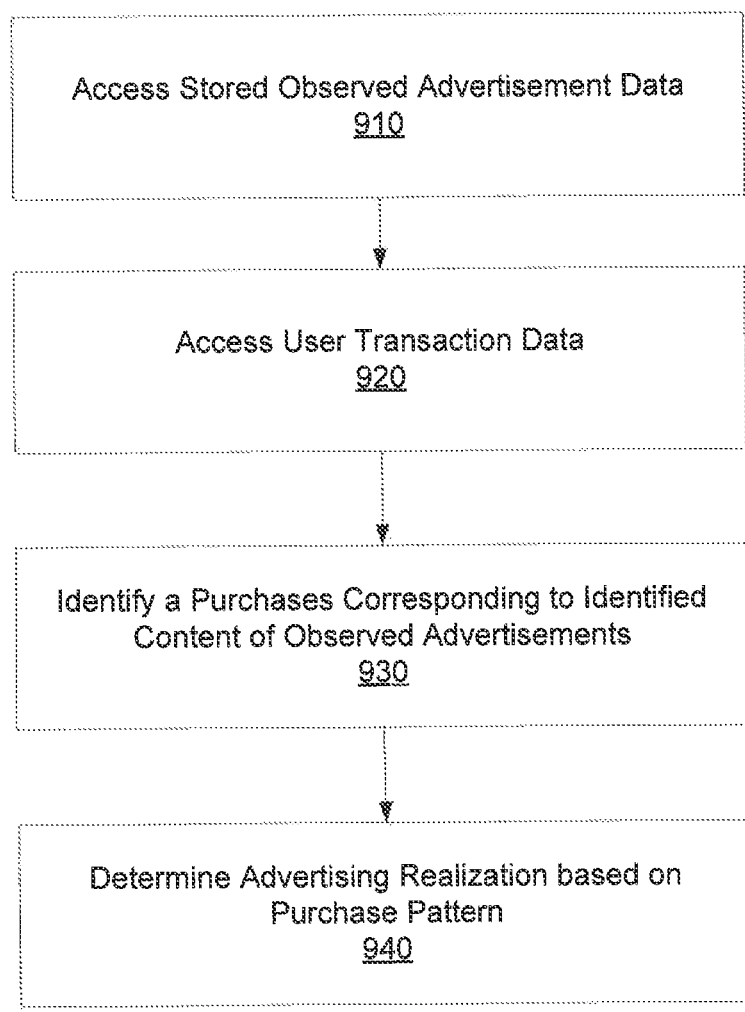
FIG. 9 is a flowchart of an exemplary realization/efficacy analysis process, consistent with disclosed embodiments.

FIG. 9 shows a flowchart of an exemplary realization/efficacy analysis process 900, consistent with disclosed embodiments. At step 910, advertising system 130, 230 may access stored data regarding advertisements observed at one or more client devices 150, 250 associated with one or more users 152, 252 (see, e.g., steps 650, 780, 820, and 830). At step 920, the advertising system may also access user transaction data (see, e.g., steps 550). In some embodiments, the advertising system may access user transaction data from local databases and/or other memory devices. Additionally or alternatively, the user transaction data may be obtained on-demand from user 152, 252 and/or financial service provider 110, 210 (see, e.g., account information collection process 500). The user transaction data may indicate financial transactions initiated or authorized by the user, including particular products and/or services purchased from particular merchants. In some embodiments, the user transaction data may be obtained from other components of system 100, 200, including merchant system(s) 160, 260. For example, consistent with disclosed embodiments, the advertising system may request and receive additional data from the merchant system(s) for a particular transaction or set of transactions associated with an identification number included in the user transaction data. At step 930, the advertising system may compare the data regarding observed advertisements with the data regarding user transactions to identify purchases corresponding to observed advertisements. For example, the advertising system may determine that the data regarding observed advertisements indicates that the user observed advertisements associated with a particular product that the user purchased. The advertising system may further determine the purchase occurred during a time period in which the advertisements were observed. In some embodiments, the advertising system may initiate a survey to determine purchases occurring during one or more time periods. The advertising system may further receive and consider survey results from one or more persons that indicate, for example, one or more products purchased, one or more advertisements observed, one or more advertisements that influenced the purchase behavior of the one or more persons, etc. In step 940, the advertising system may measure the effectiveness of one or more observed advertisements based on the correlation of purchases with observed advertisements. The advertising system may determine the effectiveness of the advertisements with respect to any one user 152, 252 or group of users 152, 252. For example, the advertising system may compare and otherwise correlate purchases with observed advertisements for a plurality of users and consider the collected information as a whole in determining effectiveness. In some embodiments, the advertising system may compare the aggregate number of users presented with an advertisement(s), advertising campaign(s), etc. with the aggregate number of those users who purchased a particular product, purchased from a particular merchant, etc. Advertising system 130 may represent the measure of effectiveness in any form (e.g., per advertisement, advertising campaign, or means of advertising) using any metric known to those of skill in the art (scores, percentages, ratings, sales realization rates, efficacy rates, click-thru rates, impressions, view-thru sales, etc.).

Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A system for providing an alternative advertisement, the system comprising:
   one or more memory devices storing instructions; and
   one or more processors configured to execute the instructions to:
      receive, over a network, a user registration request that comprises an authorization to receive data indicating that advertising content has been provided for presentation on a client device associated with a user;
      provide, in response to the user registration request, an application to the client device, the application being configured to cause the client device to:
         monitor a content signal comprising content received from a content provider for presentation on the client device,
         use pattern recognition to identify an advertisement in the received content and subject matter of the identified advertisement,
         provide data to the system indicating the identified advertisement, the data comprising the identified subject matter, and
         interrupt the monitored content signal for the duration of the presentation of the identified advertisement;
      present, on the client device, an alternative advertisement in place of the identified advertisement without presenting the identified advertisement on the client device, the alternative advertisement being provided by the system in substantially real-time in response to the system receiving the data indicating the identified advertisement, wherein presenting the alternative advertisement comprises inserting an alternative signal while the monitored content signal is interrupted;
      receive, from the client device, the data indicating the identified advertisement; and
      provide, in response to the received data indicating the identified advertisement, the alternative advertisement to the client device in substantially real-time for presentation in place of the identified advertisement.

2. The system of claim 1, wherein the user registration request includes an authorization to access financial service account data associated with the user, and wherein the one or more processors are further configured to execute the instructions to:
   determine user financial service account data associated with one or more user financial service accounts and further associated with the user;
   determine, based on the one or more user financial service accounts, user financial data indicating one or more user purchases;
   associate the one or more user purchases with the alternative advertisement based on at least the received user financial data;
   determine an effectiveness of the alternative advertisement based at least on a correlation of the one or more user purchases with the alternative advertisement; and
   determine a future alternative advertisement to be provided to the client device in substantially real-time in place of a future identified advertisement based at least on the determined effectiveness.

3. The system of claim 1, wherein:
   the application is further configured to cause the client device to present the alternative advertisement in place of the identified advertisement by:
   modifying the content received at the client device to present the alternative advertisement at a position of the identified advertisement in the content; or
   providing an overlay that remains transparent except to present the alternative advertisement at a position of the identified advertisement in the content; and
   the one or more processors are further configured to determine the alternative advertisement based on a media type of the identified advertisement in the content.

4. The system of claim 1, wherein:
   the content received at the client device comprises dynamic content; and
   the one or more processors are further configured to determine the alternative advertisement based on a media type of the identified advertisement in the content.

5. The system of claim 2, wherein the user registration request includes at least one of: identification of user log-in credentials associated with one or more user financial accounts, authorization to collect user log-in credentials from the client device, or authorization to directly access user financial accounts.

6. The system of claim 5, wherein the one or more processors are further configured to:
   access the one or more user financial accounts;
   identify one or more user purchases that may be associated with the alternative advertisement; and
   store data associated with the identified one or more user purchases.

7. The system of claim 5, wherein the one or more processors are further configured to:

obtain log-in credentials by at least one of: screen scraping during a user log-in procedure, keystroke logging during a user log-in procedure, accessing log-in credentials stored in a web browser, or accessing stored password files.

8. The system of claim 2, wherein the one or more processors are further configured to:
identify one or more products or services purchased; and
determine the one or more products or services include products or services advertised by the alternative advertisement.

9. The system of claim 2, wherein the one or more processors are further configured to:
determine the effectiveness based on a determination of an aggregate number of user purchases correlated with the alternative advertisement as compared to an aggregate number of users presented with the alternative advertisement.

10. The system of claim 1, wherein the one or more processors are further configured to:
provide targeted alternative advertisements to the client device based on criteria provided by a third-party advertiser.

11. The system of claim 1, wherein the one or more processors are further configured to:
provide targeted alternative advertisements to the client device based on criteria provided by a provider of the system.

12. The system of claim 1, wherein the application is further configured to cause the client device to identify the advertisement based on at least one of: an indication in a signal associated with the received content that an advertisement is or will become presented and metadata associated with the received content.

13. A non-transitory computer-readable medium having stored thereon executable instructions that, when executed by a processor, cause the processor to perform operations comprising:
receiving, by a system over a network, a user registration request that comprises an authorization to receive data indicating that advertising content has been provided for presentation on a client device associated with a user;
providing, in response to the user registration request, an application to the client device, the application being configured to cause the client device to:
monitor a content signal comprising content received from a content provider for presentation on the client device,
use pattern recognition to identify an advertisement in the received content and subject matter of the identified advertisement,
provide data to the system indicating the identified advertisement, the data comprising the identified subject matter, and
interrupt the monitored content signal for the duration of the presentation of the identified advertisement;
present, on the client device, an alternative advertisement in place of the identified advertisement without presenting the identified advertisement on the client device, the alternative advertisement being provided by the system in substantially real-time in response to the system receiving the data indicating the identified advertisement, wherein presenting the alternative advertisement comprises inserting an alternative signal while the monitored content signal is interrupted;
receiving, from the client device, the data indicating the identified advertisement; and
providing, by the one or more processors in response to the received data indicating the identified advertisement, the alternative advertisement to the client device in substantially real-time for presentation in place of the identified advertisement.

14. The non-transitory computer-readable medium of claim 13, wherein the application is further configured to cause the client device to present the alternative advertisement in place of the identified advertisement by:
modifying the content received at the client device to present the alternative advertisement at a position of the identified advertisement in the content;
providing an overlay that remains transparent except to present the alternative advertisement at a position of the identified advertisement in the content; or
interrupting a signal of the content for the duration of the identified advertisement's presentation, wherein the content comprises dynamic content, and presenting the alternative advertisement by inserting a new signal while the signal of the content is interrupted.

15. A client device for providing an alternative advertisement, comprising:
one or more memory devices storing instructions; and
one or more processors configured to execute the instructions to:
monitor a content signal comprising content received, over a network, from a content provider for presentation at a presentation device associated with the client device;
use pattern recognition to identify an advertisement in the received content and subject matter of the identified advertisement,
provide an indication of the identified advertisement to an advertising system, the indication comprising the identified subject matter,
receive in substantially real-time, an alternative advertisement from the advertising system, and
interrupt the monitored content signal for the duration of a presentation of the identified advertisement; and
present the alternative advertisement at the presentation device in the received content in place of the identified advertisement without presenting the identified advertisement at the presentation device, wherein presenting the alternative advertisement comprises inserting an alternative signal, at the presentation device, while the monitored content signal is interrupted.

16. The client device of claim 15, wherein the one or more processors are further configured to identify the advertisement in the received content based on at least one of: an indication in a signal associated with the content to be presented that an advertisement is or will become presented and metadata associated with the content to be presented.

17. The client device of claim 15, wherein the one or more processors are further configured to:
modify the received content to present the alternative advertisement at a position of the identified advertisement in the received content; or
provide an overlay that remains transparent except to present the alternative advertisement at a position of the identified advertisement in the received content.

18. The client device of claim 15, wherein the received content comprises dynamic content.

* * * * *